(12) United States Patent
Somers

(10) Patent No.: US 12,701,188 B2
(45) Date of Patent: Aug. 4, 2026

(54) INTERACTIVE TEXT RESPONSE SYSTEM WITH TRANSFERS BETWEEN TEXT MESSAGE THREADS

(71) Applicant: Technocentra Group, Inc., Bloomington, IL (US)

(72) Inventor: Michael Somers, Hudson, IL (US)

(73) Assignee: Technocentra Group, Inc., Bloomington, IL (US)

( * ) Notice: Subject to any disclaimer, the term of this patent is extended or adjusted under 35 U.S.C. 154(b) by 238 days.

(21) Appl. No.: 18/611,582

(22) Filed: Mar. 20, 2024

(65) Prior Publication Data

US 2024/0323280 A1 Sep. 26, 2024

Related U.S. Application Data

(60) Provisional application No. 63/453,420, filed on Mar. 20, 2023.

(51) Int. Cl.
| | |
|---|---|
| *H04M 3/00* | (2024.01) |
| *H04M 1/72436* | (2021.01) |
| *H04M 1/72445* | (2021.01) |
| *H04M 1/72469* | (2021.01) |
| *H04M 3/51* | (2006.01) |

(52) U.S. Cl.
CPC ..... *H04M 3/5191* (2013.01); *H04M 1/72436* (2021.01); *H04M 1/72445* (2021.01); *H04M 1/72469* (2021.01); *H04M 2201/42* (2013.01)

(58) Field of Classification Search
CPC .......... H04M 3/5191; H04M 1/72436; H04M 1/72445; H04M 1/72469; H04M 2201/42

USPC ....... 379/265.01–265.14, 266.01–266.1, 309
See application file for complete search history.

(56) References Cited

U.S. PATENT DOCUMENTS

| | | | | |
|---|---|---|---|---|
| 7,702,792 B2 * | 4/2010 | Shaffer | ............... | H04L 65/1069 |
| | | | | 709/227 |
| 8,204,520 B2 * | 6/2012 | Hwang | ................. | H04L 51/214 |
| | | | | 455/414.1 |
| 11,743,383 B2 * | 8/2023 | Willshire | ............ | H04M 3/5183 |
| | | | | 379/265.09 |
| 2008/0253543 A1 * | 10/2008 | Aharon | ............. | H04M 3/42314 |
| | | | | 379/201.12 |
| 2011/0142211 A1 * | 6/2011 | Maes | .................... | H04L 51/214 |
| | | | | 379/88.13 |

(Continued)

*Primary Examiner* — William J Deane, Jr.
(74) *Attorney, Agent, or Firm* — Fitch, Even, Tabin & Flannery LLP

(57) ABSTRACT

Methods and systems of managing application-to-person text messages include receiving, by an application running on a computing device and providing access to multiple distinct application-linked phone lines, a first text message from a first communication device having a unique phone number. In response to this text message, a first text message thread is generated that includes the first communication device and a first application-linked phone line having a first phone number. The first text message thread provides a text message transfer option selectable by a user of the first communication device. In response to the user of the first communication device interacting with the text message transfer option, the first communication device is transferred to communicate by text messages with a second application-linked phone line having a second phone number that is different from the phone number of the first application-linked phone line.

20 Claims, 5 Drawing Sheets

(56) References Cited

U.S. PATENT DOCUMENTS

| | | | |
|---|---|---|---|
| 2016/0321245 A1* | 11/2016 | Chisholm | G06F 40/58 |
| 2016/0323725 A1* | 11/2016 | Lew | H04L 51/212 |
| 2022/0294906 A1* | 9/2022 | Lew | H04W 4/21 |

* cited by examiner

FIG. 5

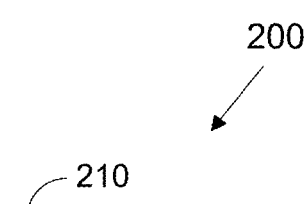

200

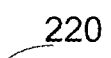

210 receiving, by an application running on a computing device and providing access to application-linked phone lines each having an individual assigned phone number, a first text message from a first communication device having a unique phone number

220 generating, in response to the receiving of the first text message, a first text message thread that includes the first communication device and a first application-linked phone line having a first phone number, the first text message thread configured to display a text message transfer option selectable by a user of the first communication device

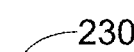

230 in response to the user of the first communication device interacting with the text message transfer option within the first text message thread, transferring the first communication device to communicate, via at least one text message, with a second application-linked phone line having a second phone number that is different from the phone number of the first application-linked phone line

INTERACTIVE TEXT RESPONSE SYSTEM WITH TRANSFERS BETWEEN TEXT MESSAGE THREADS

CROSS-REFERENCE TO RELATED APPLICATION

This application claims the benefit of U.S. Provisional App. No. 63/453,420, filed Mar. 20, 2023, which is incorporated herein by reference in its entirety.

TECHNICAL FIELD

This invention relates generally to customer communication systems, and, more specifically, to interactive customer communication systems.

BACKGROUND

Customer support systems are commonly used as an interface between companies and customers of such companies. For example, many companies now provide their customers with the ability to interact (e.g., via a computer or a smart-phone) with a live agent, a chat bot, and/or virtual assistant to help the customers resolve their technical support, billing, or other issues. For instance, a customer may use a phone line or a live chat window on a company's website to initiate a call or chat session with a live technical support agent, and the customer's issue or question may be resolved by the live support agent during the call or chat session.

In such voice or live-chat technical support systems, the customer may be initially greeted by a bot, but, after a live technical support agent becomes available, or is assigned by the bot to the customer, the live technical support agent takes over the chat session and communicates (instead of the bot) with the customer within the chat session. After the customer's issue or question is resolved, the chat session is closed. If the customer has a different (e.g., a billing) question, the customer is typically required to initiate a second phone call to the billing support line, or to initiate a second, billing support chat session on the company's website.

SUMMARY

Generally speaking, this disclosure describes systems and methods that provide for the transferring of an external phone line, from a text message thread between the external phone line and an internal application-to-person phone line, to another, separate text message thread with one or more different internal application-to-person phone lines. Such systems and methods, which facilitate a transfer or conference of text message threads from one text message thread to another text message thread (which may include one or more phone lines), are collectively referred to herein as "interactive text response (ITR) systems."

In some embodiments, a method of managing application-to-person text messages includes: receiving, by an application running on a computing device and providing access to application-linked phone lines each having an individual assigned phone number, a first text message from a first communication device having a unique phone number; generating, in response to the receiving of the first text message, a first text message thread that includes the first communication device and a first application-linked phone line having a first phone number, the first text message thread configured to display a text message transfer option selectable by a user of the first communication device; and in response to the user of the first communication device interacting with the text message transfer option within the first text message thread, transferring the first communication device to communicate, via at least one text message, with a second application-linked phone line having a second phone number that is different from the phone number of the first application-linked phone line.

In one aspect, the method further includes assigning one or more designations to the user of the first communication device to create a record of options selected by the user of the first communication device in response to one or more prompts presented to the user of the first communication device within the first text message thread.

In certain embodiments, the method further includes generating a second text message thread that is separate from the first text message thread and that includes the first communication device and the second application-linked phone line but does not include the first application-linked phone line. In some aspects, the transferring step further comprises permitting an administrator of the application to at least one of: assign consent gathering bots, assign data gathering bots, provide self-service prompt options, set one or more notifications, and set data sharing that would accompany the transferring of the first communication device to communicate with the second application-linked phone line.

In some implementations, the method further comprises including, in the second text message thread, at least one of: a thread history that displays at least a portion of the application-to-person text messages exchanged between the first communication device and the first application-linked phone line; an interactive hyperlink which, when interacted with, causes the second text message thread to display at least a portion of the application-to-person text messages exchanged between the first communication device and the first application-linked phone line; and an attached file which, when opened, causes the second text message thread to display at least a portion of the application-to-person text messages exchanged between the first communication device and the first application-linked phone line.

In certain aspects, the method further includes generating within the first text message thread a consents and permissions option which, when interacted with by the user of the first communication device, permits the user of the first communication device to select a level of consent of the user of the first communication device to receive at least one of conversational, informational and promotional text messages, or to indicate a level of consent to share personal information by the user of the first communication device; and restricting at least some portions of the first text message thread from view within the second text message thread based on at least one of: permissions granted to users of the application-linked phone lines, settings defined by an administrator of the application, and privacy designations reflected by the level of consent of the user of the first communication device to share the personal information. In one aspect, the method further includes providing within the second text message a hyperlink which, when interacted with by a user of the second application-linked phone line, opens a secure web page to display, to the user of the second application-linked phone line, the portions of the first text message thread that are not displayed within the second text message thread.

In some embodiments, the method further includes generating, within the first text message thread, an informational message acknowledging a selection made by the user of the first communication device via the text message transfer option, wherein the informational text message notifies the user of the first communication device to expect a text message from the second application-linked phone line to which the first communication device is being transferred.

In certain aspects, the method further includes presenting two or more application-linked phone lines each having an individual assigned phone number that is different from the first application-linked phone line with an option to claim a transfer of the first communication device from the first application-linked phone line and transferring the first communication device to the second text message thread to communicate via at least one text message with the application-linked phone line that was first to claim the transfer of the first communication device.

In some implementations, the method further includes adding the second application-linked phone line having the second phone number into the first text message thread or into a new group text message thread to permit the second application-linked phone line to communicate with the first communication device and with the first application-linked phone line within the first text message thread or the new group text message thread.

In some embodiments, a system for managing application-to-person text messages includes: an application executable on a computing device and providing access to application-linked phone lines each being associated with an individual assigned phone number. The computing device is configured, via the application, to: receive a first text message from a first communication device having a unique phone number; generate, in response to receipt of the first text message, a first text message thread that includes the first communication device and a first application-linked phone line having a first phone number, the first text message thread configured to display a text message transfer option selectable by a user of the first communication device; and in response to an interaction by the user of the first communication device with the text message transfer option within the first text message thread, transfer the first communication device to communicate, via at least one text message, with a second application-linked phone line having a second phone number that is different from the phone number of the first application-linked phone line.

In certain aspects, the computing device may assign one or more designations to the user of the first communication device to create a record of options selected by the user of the first communication device in response to one or more prompts presented to the user of the first communication device within the first text message thread.

In some implementations, the computing device may cause the application to generate a second text message thread that is separate from the first text message thread and that includes the first communication device and the second application-linked phone line but does not include the first application-linked phone line. In some aspects, the computing device may permit an administrator of the application to at least one of: assign consent gathering bots, assign data gathering bots, provide self-service prompt options, set one or more notifications, and set data sharing that would accompany the transferring of the first communication device to communicate with the second application-linked phone line.

In certain aspects, the computing device may cause the application to include, in the second text message thread, at least one of: a thread history that displays at least a portion of the application-to-person text messages exchanged between the first communication device and the first application-linked phone line; an interactive hyperlink which, when interacted with, causes the second text message thread to display at least a portion of the application-to-person text messages exchanged between the first communication device and the first application-linked phone line; and an attached file which, when opened, causes the second text message thread to display at least a portion of the application-to-person text messages exchanged between the first communication device and the first application-linked phone line.

In certain implementations, computing device may cause the application to generate within the first text message thread a consents and permissions option which, when interacted with by the user of the first communication device, permits the user of the first communication device to select a level of consent of the user of the first communication device to receive at least one of conversational, informational and promotional text messages, or to indicate a level of consent to share personal information by the user of the first communication device; and restrict at least some portions of the first text message thread from view within the second text message thread based on at least one of: permissions granted to users of the application-linked phone lines, settings defined by an administrator of the application, and privacy designations reflected by the level of consent of the user of the first communication device to share the personal information. In one aspect, the computing device may cause the application to include within the second text message a hyperlink which, when interacted with by a user of the second application-linked phone line, opens a secure web page to display, to the user of the second application-linked phone line, the portions of the first text message thread that are not displayed within the second text message thread.

In certain embodiments, the computing device may cause the application to generate, within the first text message thread, an informational message acknowledging a selection made by the user of the first communication device via the text message transfer option, wherein the informational text message notifies the user of the first communication device to expect a text message from the second application-linked phone line to which the first communication device is being transferred.

In some aspects, the computing device may cause the application to: provide two or more application-linked phone lines each having an individual assigned phone number that is different from the first application-linked phone line with an option to claim a transfer of the first communication device from the first application-linked phone line; and transfer the first communication device to the second text message thread to communicate via at least one text message with the application-linked phone line that was first to claim the transfer of the first communication device.

In some embodiments, the computing device may cause the application to add the second application-linked phone line having the second phone number into the first text message thread or into a new group text message thread to permit the second application-linked phone line to communicate with the first communication device and with the first application-linked phone line within the first text message thread or the new group text message thread.

A better understanding of the features and advantages of various embodiments of the present invention will be obtained by reference to the following detailed description and accompanying drawings which set forth illustrative embodiments of the invention.

BRIEF DESCRIPTION OF THE DRAWINGS

Disclosed are embodiments of systems, user interfaces, and methods pertaining to managing application to person text messages. This description includes drawings, wherein:

FIG. 5 depicts a flow chart of a method of managing application to person text messages in accordance with some embodiments.

Figure 1:
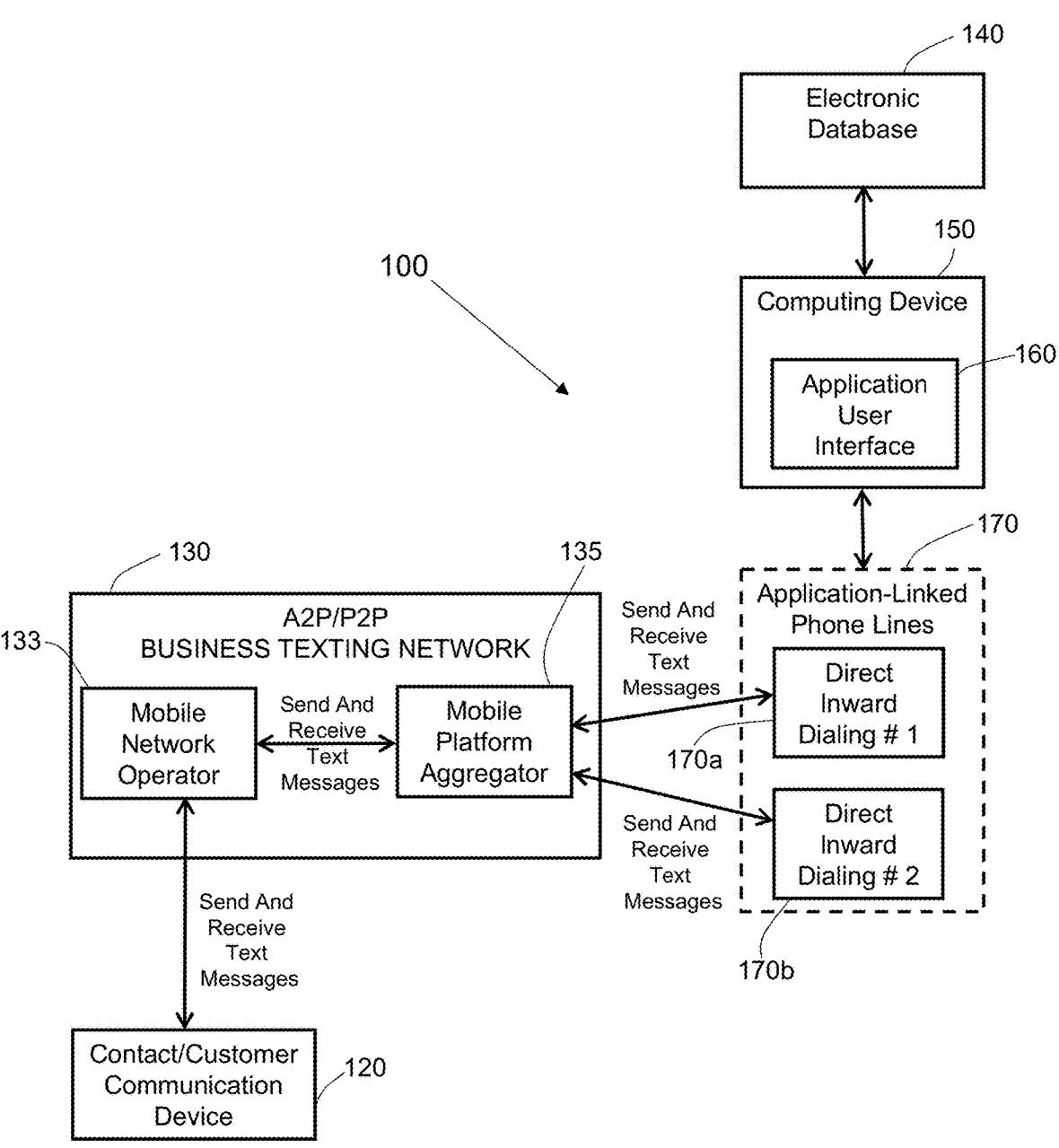
FIG. 1 is a diagram of a system of managing application to person text messages in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/ or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods of managing application-to-person text messages include receiving, by an application running on a computing device and providing access to multiple distinct application-linked phone lines, a first text message from a first communication device having a unique phone number. In response to this text message, a first text message thread is generated that includes the first communication device and a first application-linked phone line having a first phone number. The first text message thread provides a text message transfer option selectable by a user of the first communication device. In response to the user of the first communication device interacting with the text message transfer option, the first communication device is transferred to communicate by text messages with a second application-linked phone line having a second phone number that is different from the phone number of the first application-linked phone line.

In some embodiments the present application describes a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments, the present disclosure provides one or more non-transitory computer-readable storage mediums storing one or more computer programs adapted or configured to cause a processor-based apparatus or system to execute steps comprising any one or more of the embodiments, methods, approaches, schemes, and/or techniques described herein.

A2P 10DLC and OTT Inter-System, Intra-System, and Extra-System Message Thread Transferring In some embodiments, systems and methods that allow direct inward dialing (DID) users of a business communication software, any users with licenses to the same software, or systems with access to business communications software data to transfer select certain application-to-person ten-digit long code (A2P 10DLC) messages, short message system (SMS) messages, multimedia message system (MMS) messages, rich communication service (RCS) messages, or over-the-top (OTT) messages, and transfer message threads including such messages (e.g., from their contacts along with other contact data) to one or more other user DIDs, shared DIDs, or message termination endpoint within the same business communication software, any one or more users or business communication software with DIDs, any shared DID, message termination endpoint, or any combination thereof.

In certain aspects, when a user communicating with a contact/customer via a text message thread initiates a transfer of the contact/customer, the transferring user may choose the transfer destination, for example, by selecting from eligible transfer destinations within the business communication software, or by inserting a transfer destination manually. In addition, the transferring user may: select any amount of the thread history to share in a second text message thread with the user to whom the contact/customer is being transferred (as part of the transfer through the transfer user interface); select certain other data to include as part of the transfer; insert a transfer introduction message to be seen by the contact and the transferees(s); insert a transfer debrief message to be seen by certain selected transferee(s); preview the draft transfer; adjust certain transfer preset settings; and initiate the transfer.

In some embodiments, when multiple transferees are selected, the first transferee selected can be automatically designated as the transferee leader from whom the automatic introduction message to the transferred contact/customer can come from. In some aspects, when a transfer occurs, the transferee(s) can receive the transferred thread in their messages inbox, and when the transferee(s) receives the transferred thread in their inbox, the thread history can be displayed as if it originated in the transferee's thread, as a packaged expandable insert, or as a link that the transferee can visit to review the shared thread history. In some aspects, the thread history may display message metadata such as the transferring user's information, times, or other system data or metadata.

In some implementations, upon a text message thread transfer initiation, the system can automatically send a message from the transferer to the contact/customer, and this message can originate from the transferee leader's DID or endpoint, and this transferred text message thread can include certain data, including but not limited to the thread history that was shared, certain other data that was included as part of the transfer, and a transfer introduction message to be seen by the contact and transferees. In certain aspects, such data can be included directly in the text message thread as a standard message, a prepackaged embedded and expandable message, a secure link that every participant of the text message thread can view, or any combination thereof. In one aspect, text message thread between the contact/customer and the transferee user (e.g., support agent) may include a transfer debrief message to be seen by the transferee(s), and the transfer debrief will only be visible to the transferee(s) (e.g., after interacting with a link, or viewable by the transferee(s) directly through the business communications software as an internal note or a private message.

A2P 10DLC and OTT Inter-System, Intra-System, and Extra-System Message Thread Conferencing In some embodiments, systems and methods that allow direct inward dialing (DID) users of a business communication software, any users with licenses to the same software, or systems with access to business communications software data to transfer select certain application-to-person ten-digit long code (A2P 10DLC) messages, short message system (SMS) messages, multimedia message system (MMS) messages, rich communication service (RCS) messages, or over-the-top (OTT) messages, and package these text message threads with their contacts/customers based on the users' or systems' determination of relevant text message thread history, the inclusion of certain other thread data available to users on the user interface, or metadata related to the messages, and use such a prepackaged thread to allow another user within the same business communication software or any user of another system or system that has access to the same business communications software system data from which the transferer can transfer the message thread, to join the thread or subsequently be removed from the thread.

In some embodiments, when invited by the inviting user, the invitee or joiner user can receive the prepackaged text message thread in the invitee's or joiner's messages inbox with the text message thread history displayed as if it originated in that user's thread. In some aspects, when a text message thread history is added to the joiner's inbox, the system can display message metadata such as the senders of text messages, the times the text messages were sent, or other arbitrary metadata. In one aspect, the contact can receive an automated message from the inviter, indicating that a joiner has been added to the text message thread and indicating what text message thread history between the inviter and the contact was shared with the joiner.

In certain embodiments, when the joiner sends an outbound message to the text message thread, an outbound message origination routing can be used so that the contact can receive all messages from the inviter's DID, and where all messages from joiners and inviters are delivered into the text message thread with appended signatures of the same so that the contact is able to visually tell who the incoming text message is from. In some aspects, when any joiner of a text message thread sends a message, automated or otherwise, other joiners or the inviter receive the message as a group message. In one aspect, when a joiner leaves the group text message thread, an automated message is generated within the text message thread to provide a notification that the joiner has left the text message thread.

In some embodiments, when a former joiner rejoins the text message thread, the former joiner who rejoined can receive a new message in the existing text message thread from the same conference text, and when the former joiner receives a new message in that text message thread, that thread can be updated with the history that can be chosen to be shared by the inviter, and should the inviter's chosen shared text message thread history present a history gap to the rejoiner, that gap can be displayed to the rejoiner (or if the rejoiner requests to fill in this history gap, the inviter may grant such a request).

A2P 10DLC and OTT Delegated Data Access Communication Protocols Between Users and Contacts In some embodiments, systems and methods create information equity between users of business communication software systems and their contacts. For example, when a user on a shared application-to-person ten-digit long code (A2P 10DLC) direct inward dialing (DID) endpoint or shared over-the-top (OTT) endpoint contributes to the same text message thread, when this user sends text a message, the text message can be appended with certain data including, but not limited to the user's name, certain system data, the name of the DID or OTT termination or origination point as described by certain naming conventions, what thread history the user has access to, what contact account data the user has access to, and what contact account data that user has reviewed and when they reviewed it.

In certain aspects, when this certain data is appended, the system can automatically create a secure webpage for the contact to visit to view certain data and when the user is composing the text message, the user interface can display the data to be appended to this text message in real-time. In one aspect, when that user views the data to be appended to the text message being composed, the user can elect to adjust certain settings to change the appended data. In some embodiments, system administrators can affect global settings with respect to which data is to be appended to these user's text messages, which may be mandatory or flexible based on the user's permissions or role or other certain data related to the context of the text message thread or system.

FIG. 1 shows an exemplary embodiment of an interactive text response (ITR) system 100 for managing application-to-person (A2P) and/or person-to-person (P2P) text messages. The system 100 depicted in FIG. 1 includes a computing device 150 operatively coupled to an application user interface 160 (also referred to herein simply as "an application") executable on the computing device 150 and providing access to application-linked phone lines 170 (e.g., direct inward dialing line #1 170a, direct dialing line #2 170b, etc.) each being associated with an individual assigned phone number. Notably, while only two application-linked phone lines 170a and 170b are shown in FIG. 1, it will be appreciated that, depending on system size requirements of a given business/company, the interactive text response system 100 may include more than two (e.g., 5, 10, 20, 50, etc.) direct inward dialing phone lines 170.

The computing device 150 of FIG. 1 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. The computing device 150 may be located at the same physical location as an electronic database 140 (which will be discussed below), or may be located at a remote location relative to the electronic database 140.

In the exemplary system 100 shown in FIG. 1, the computing device 150 may communicate (as indicated by the two-way arrows between the computing device 150 and the electronic database 140, as well as the two-way arrows between the computing device 150 and the application-linked phone lines 170) with one or more electronic devices of the system 100 via a wide-area network (WAN), a local area network (LAN), a personal area network (PAN), a wireless local area network (WLAN), or any other internet or intranet network, or combinations of such networks. Generally, communication between various electronic devices of the system 100 may take place over hard-wired, cellular, Wi-Fi or Bluetooth networked components or the like. In some embodiments, one or more electronic devices of the system 100 may include cloud-based features, such as cloud-based memory storage.

In the embodiment of FIG. 1, the computing device 150 is coupled to an electronic database 140. In some embodiments, the electronic database 140 may be configured to store various information pertaining to a customer (also referred to herein as a "contact") that interacts with the computing device 150 and/or application-linked phone lines 170 via a communication device 120 (which may be a cellular phone or another phone line) by sending text messages to and receiving text messages from the computing device 150 and/or one or more application-linked phone lines 170. The electronic database 140 may be stored, for example, on non-volatile storage media (e.g., a hard drive, flash drive, or removable optical disk) internal or external to the computing device 150, or internal or external to computing devices separate and distinct from the computing device 150. It will be appreciated that the electronic database 140 may likewise be cloud-based. Notably, while the computing device 150 is illustrated in FIG. 1 as being coupled to one electronic database 140, it will be appreciated that the computing device 150 may be coupled to two or more electronic databases configured to store various types of data information that facilitate the operation of system 100 and the use of the system by various users (e.g., system administrators, operators of the application-linked phone lines 170, etc.).

In some embodiments, the computing device includes an application user interface 160 generated by an application that may be installed on the computing device 150 or accessible (e.g., via a third-party service) by the computing device 150. For example, this application may be a dedicated application (e.g., an application installed on the computing device 150) or may be cloud-based, browser-based, or may be native to an operating system of a computer or server remote to the computing device 150. The application associated with the application user interface 160 may be an application to person (A2P) application and/or a person to person (P2P) application.

In the exemplary embodiment of the interactive text response system 100 illustrated in FIG. 1, the text messages are sent between the communication device 120 of a contact (also referred to as a "customer") and the DID phone lines 170*a* and 170*b* linked to an application running on the computing device 150 via an Application to Person (A2P)/Person to Person (P2P) business texting network 130. In certain implementations, to be permitted to receive text messages from and/or send text messages to the communication device 120 of a customer via the A2P/P2P business texting network 130, each one of the application-linked phone lines 170 is individually registered (as an authorized user) with the A2P/P2P business texting network 130.

In the embodiment illustrated in FIG. 1, the A2P/P2P business texting network 130 comprises a mobile network operator 133 through which text messages are sent to and from the communication device 120 of a contact, as well as a mobile platform aggregator 135 through which text messages are sent to and from the application-linked phone lines 170. In certain embodiments, as will be described in more detail below, the computing device 150 is configured to receive (e.g., via the A2P/P2P business texting network 130) a first text message from the communication device 120 having a unique phone number (e.g., a 10-digit number). After the computing device 150 receives such a text message, the computing device 150 is configured to generate a first text message thread that includes the communication device 120 and a first application-linked phone line 170*a* having a first phone number (e.g., a 10-digit number).

In some embodiments, as will be discussed in further detail below with reference to FIGS. 3-4, the first text message thread (see FIG. 3) that permits the communication device 120 and the first application-linked phone line 170 to exchange text messages is configured to display a text message transfer option selectable by a user (i.e., customer or contact) of the communication device 120. This text message transfer option, if selected by/interacted with by the user of the communication device 120, causes the communication device 120 to be transferred from the first text message thread seen in FIG. 3 to a separate text message thread seen in FIG. 4 to communicate with a second application-linked phone line 170*b* having a second phone number that is different from the phone number of the first application-linked phone line.

It is noted that not all components and/or features illustrated in FIG. 1 (and described above) are included in all embodiments of the system 100. That is, some components and/or features may be optional depending on a particular implementation of the system 100.

Figure 2:
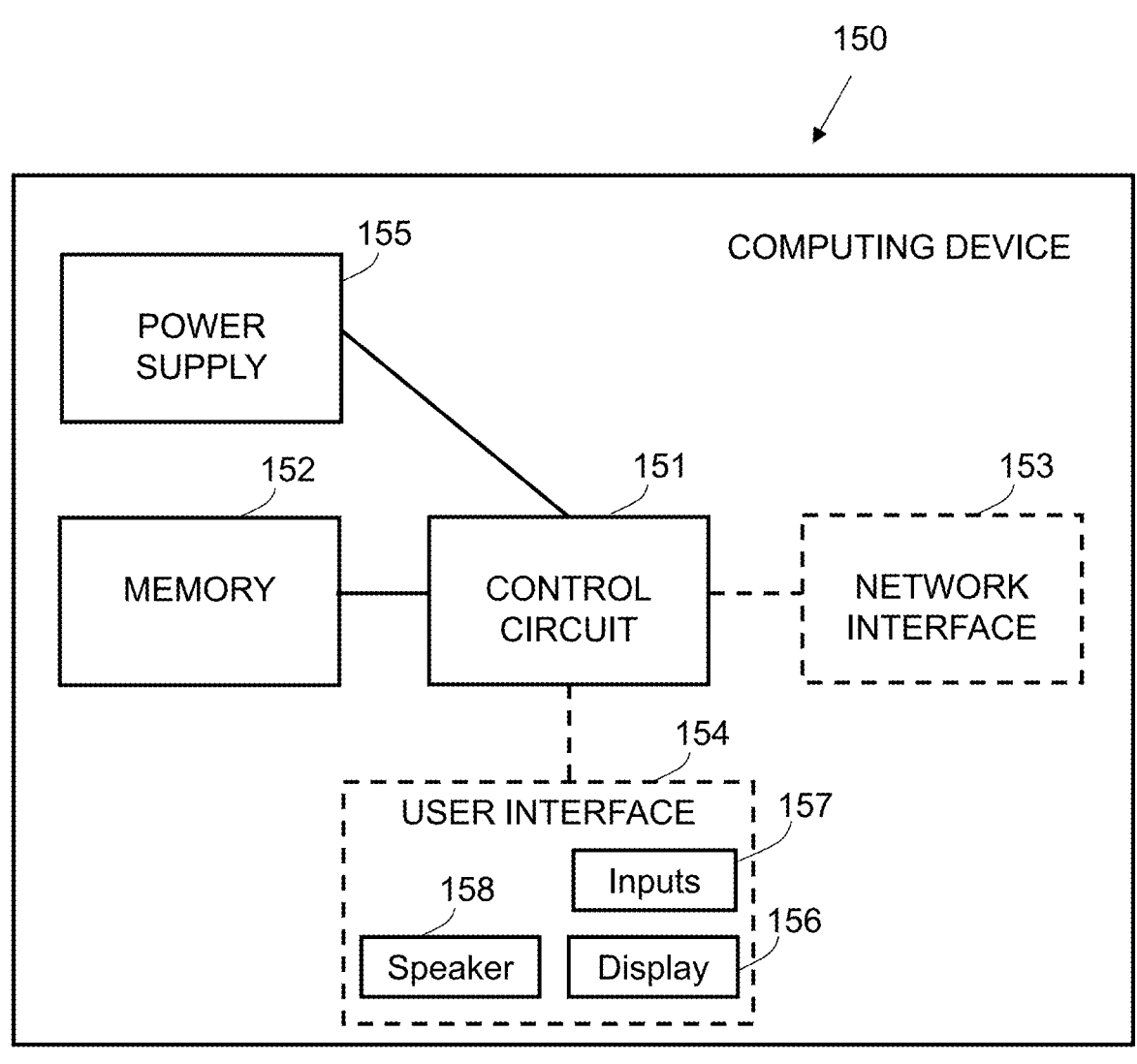
FIG. 2 is a functional block diagram of an exemplary computing device in accordance with some embodiments.

In some embodiments, a control circuit may be employed to carry out some or all of the actions, steps, and/or functions described herein. FIG. 2 shows an example of an enabling computing device 150 that includes a control circuit 151, which may include a programmable processor, and comprise a structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect control.

The exemplary control circuit 151 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise one or more partially or wholly-programmable hardware platforms (including but not limited to microcontrollers, microprocessors, and the like). The control circuit 151 is configured (for example, by using corresponding programming) to carry out one or more of the steps, actions, and/or functions described herein.

By one optional approach, the control circuit 151 operably couples to a memory 152. This memory 152 may be integral to the control circuit 151 or can be physically discrete (in whole or in part) from the control circuit 151. The memory 152 can also be local with respect to the control circuit 151 (where, for example, both share a common circuit board, chassis, power supply, and/or housing) or can be partially or wholly remote with respect to the control circuit 151 (where, for example, the memory 152 is physically located in another facility). It will also be understood that the memory 152 may comprise a plurality of physically discrete memories that, in the aggregate, store pertinent information.

The memory 152 can serve, for example, to non-transitorily store computer instructions that, when executed by the control circuit 151, cause the control circuit 151 to implement actions described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

In the example illustrated in FIG. 2, the control circuit 151 is electrically coupled to a power supply 155. In addition, the exemplary control circuit 151 is operably coupled to a network interface 153. So configured, the control circuit 151 can communicate with other elements (both within the computing device 150 and with external devices (e.g., application-linked phone lines 170a and 170b, communication device 120, etc.) via the network interface 153. In some embodiments, the network interface 153 serves as a signal input/output of the computing device 150, enabling the computing device 150 to send signals and data to and receive signals and data from, e.g., application-linked phone lines 170a and 170b, communication device 120, etc.

Network interfaces, including both wireless and non-wireless platforms, are well understood in the art. A non-exhaustive listing of suitable network interfaces would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 151 to another such control circuit, to a local area network, or to any of a variety of wide area networks or extranets (such as, but not limited to, the Internet).

In the example shown in FIG. 2, the control circuit 151 operably couples to a user interface 154. This user interface 154 can comprise any of a variety of user-input mechanisms (including, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

In the illustrated exemplary embodiment, the user interface 154 includes a visual display or display screen 156 (e.g., light-emitting diode (LED) screen) and/or button input 157 that provide the user interface 154 with the ability to permit an operator of the computing device 150 (e.g., an administrator of the ITR system 100) to manually control the computing device 150 by inputting commands (e.g., to set various system options) via touch-screen and/or button operation and/or voice commands. In the illustrated embodiment, the exemplary user interface 154 of the computing device 150 includes a speaker 158 that provides audible feedback (e.g., alerts) to the operator of the computing device 150. It will be appreciated that the performance of such functions by the processor-based control circuit 151 of the computing device 150 is not dependent on a human operator, and that the control circuit 151 of the computing device 150 may be programmed to perform such functions without a human operator.

It is noted that not all components and/or features illustrated in FIG. 2 (and described above) are included in all embodiments of the computing device 150. That is, some components and/or features may be optional depending on a particular implementation of the computing device 150.

Figure 3:
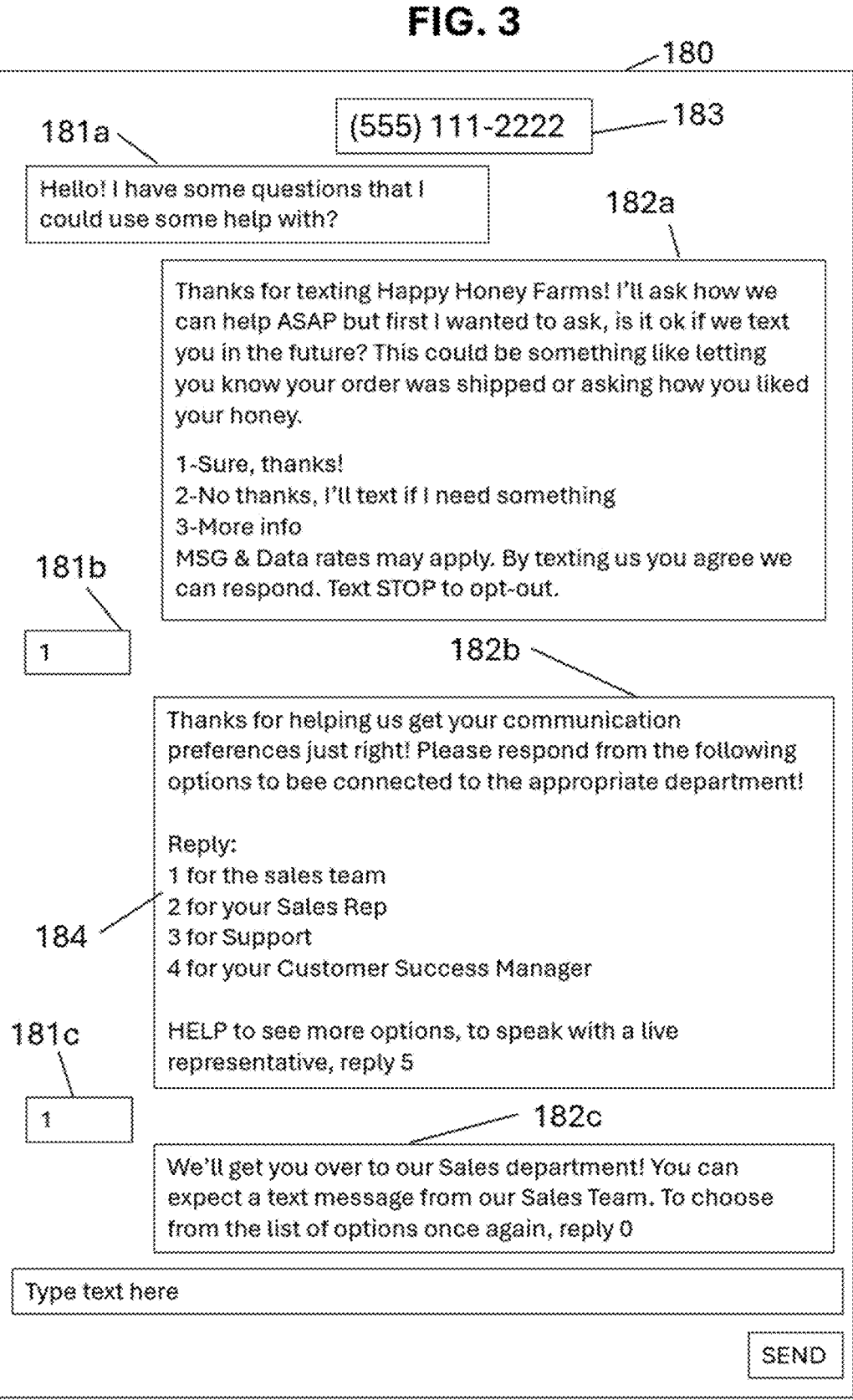
FIG. 3 depicts a screen shot of an exemplary first text message thread between a first communication device and a first phone line linked to an ITR application and having a unique 10-digit phone number.

FIG. 3 provides one example of a application to person text message-based interaction that may occur within the interactive text response system 100 of FIG. 1 between the communication device 120 and a first (e.g., DID) phone line 170a having a unique 10-digit phone number and operably coupled to the computing device 150 running an ITR application. In particular, FIG. 3 shows an exemplary application to person text message thread 180 between the communication device 120 and the first phone line 170a, and displays the text messages 181a-181c sent from the communication device 120 to the first phone line 170a and the responsive messages 182a-182c sent to the communication device 120 from the first phone line 170a.

In the example shown in FIG. 3, the illustrated text message thread 180 is taken from the point of view of the communication device 120 (i.e., the text message thread that would be seen by the operator of the communication device 120), and displays the unique (in this case, 10-digit) phone number 183 of the first phone line 170a (i.e., (555) 111-2222), which is communicating (i.e., exchanging text messages) with the communication device 120 (e.g., via the A2P/P2P texting network 130 discussed above with reference to FIG. 1).

In some embodiments, each text message sent from the communication device 120 to the ITR application-linked first phone line 170a causes the generation/assignment of a tag or designation to the operator of the communication device 120. In the example shown in FIG. 3, the initial text message 181a sent from the communication device 120 to the ITR application-linked first phone line 170a indicates that the contact or customer operating the communication device 120 is looking for help in answering some questions. In one aspect, in response to receipt of the first text message 181a (i.e., "Hello! I have some questions that I could use some help with?"), the computing device 150 assigns a first tag or designation to the customer to create a record of the first text message 181a sent by the customer within the first text message thread 180, which enables the computing device 150 to track the progress of the customer within the first text message thread 180. The tag/designation may be stored in the electronic database 140 in some embodiments.

In the example shown in FIG. 3, the first text message 181*a* sent from the communication device 120 to the ITR application-linked first phone line 170*a* resulted in a first responsive text message 182*a* to be sent from the phone line 170*a* to the communication device 120 via the first text message thread 180. In this example, the responsive text message 182*a* provides a greeting to the customer and invites the customer to elect by inputting a word, phrase, and/or a numerical character, a level of consent/permissions that the customer is willing to grant to the ITR system 100 to send (e.g., conversational, informational and promotional, etc.) text messages to the customer's communication device 120 in the future. In the illustrated example, the customer is presented with three numerical options (i.e., 1, 2, and 3) to elect whether the ITR system 100 will be permitted to text the customer's communication device 120 in the future, with number "1" corresponding to a "Sure, thanks!" response, number 2 corresponding to a "No thanks, I'll text if I need something" response, and number 3 corresponding to a "More info" response.

In the example shown in FIG. 3, the text (i.e., "1") of the second text message 181*b* sent from the communication device 120 in response to the ITR application-linked first phone line 170*a* in response to the first text message 182*a* sent by the first phone line 170*a* indicates that the contact or customer operating the communication device 120 is consenting to receive future text messages from one or more phone lines 170 associated with the ITR system 100. In one aspect, in response to receipt of the second text message 181*b* from the communication device 120 (the response being "1"), the computing device 150 assigns a second tag or designation to create a record of the text of the second text message 181*b* sent by the customer in the first text message thread 180, which enables the computing device 150 to track the progress of the customer within the first text message thread 180, even if the customer were to consecutively text to the phone line 170*a* three identical numerical responses (e.g., "1") in response to three different text-based queries/questions. This created tag/designation may be stored in the electronic database 140 in some embodiments.

In the example shown in FIG. 3, the second text message 181*b* sent from the communication device 120 to the ITR application-linked first phone line 170*a* resulted in a second responsive text message 182*b* to be sent from the phone line 170*a* to the communication device 120 via the first text message thread 180. Here, the responsive text message 182*b* includes a text message transfer option 184 selectable/interactable with by a user of the communication device 120 to cause a transfer of the communication device 120 from the first text message thread 180 to a second (separate) text message thread 185 including a second ITR application-linked phone 170*b* line having a phone number 186 (i.e., "(555) 111-2233") that is different from the phone number 183 (i.e., "(555) 111-2222") of the first ITR application-linked phone line 170*a* with which the communication device 120 communicated within the text message thread 180.

In this particular example, the text message transfer option 184 is in the form of a query to the operator of the communication device 120 to reply by selecting an option from a list of options (i.e., "Sales Team," "Sales Rep," "Support," and "Customer Success Manager), each of which are selectable by the operator of the communication device 120 by typing in an appropriate response. In the illustrated example, an appropriate response is one of numerical values "1," "2," "3," and "4," each of which is respectively associated with one of the options listed in the text message transfer option 184. Of course, it will be appreciated that, instead of typing in a number to select a respective one of the listed options, the text message transfer option 184 may present the operator of the communication device 120 with a choice to type in an appropriate letter or combination of letters (e.g., "A," "B," "C," and "D," or "SALES," "SALES-REP," "SUPPORT," "SUCCESS") that is associated with a respective), or to click on an appropriately located link.

In the example shown in FIG. 3, the third text message 181*c* sent from the communication device 120 to the ITR application-linked first phone line 170*a* in response to the text message transfer option 184 presented to the operator of the communication device 120 within the text message 182*b* indicates that the contact or customer operating the communication device 120 is looking to be transferred to the sales team (this is indicated by the fact that the text message 181*c* states "1," which matches the "Sales Team" option of the text message transfer option 184. In one aspect, in response to receipt of the text (i.e., "1") of the third text message 181*c*, where the operator of the communication device 120 chose to be transferred to the sales team, the computing device 150 assigns a third tag or designation to create a record of the third text message 181*c* sent by the contact in the first text message thread 180, which allows the computing device 150 to easily track the text messages sent by the operator of the computing device 120 within the first text message thread 180. This tag/designation may be stored in the database 140 in some aspects.

In the example shown in FIG. 3, the third text message 181*c* sent from the communication device 120 to the ITR application-linked first phone line 170*a* resulted in a third responsive text message 182*c* to be sent from the phone line 170*a* to the communication device 120 via the first text message thread 180. Here, the responsive text message 182*c* is an informational message acknowledging a selection (i.e., "1") made by the operator of the communication device 120 via the text message transfer option 184. In this example, the informational text message 182*c* acknowledges the selection by the operator of the communication device 120 to be transferred to the sales team and notifies the operator of the communication device 120 to expect a text message from someone on the sales team. In some aspects, in conjunction with causing the text message 182*c* to be sent to the communication device 120, the computing device 150 causes a second phone line 170*b* linked to the ITR application and having a unique 10-digit phone number 186 (in this case, "(555) 111-2233") that is different from the phone number 183 (i.e., "(555) 111-2222") of the first phone line 170*a* to send a text message to the communication device 120.

Figure 4:
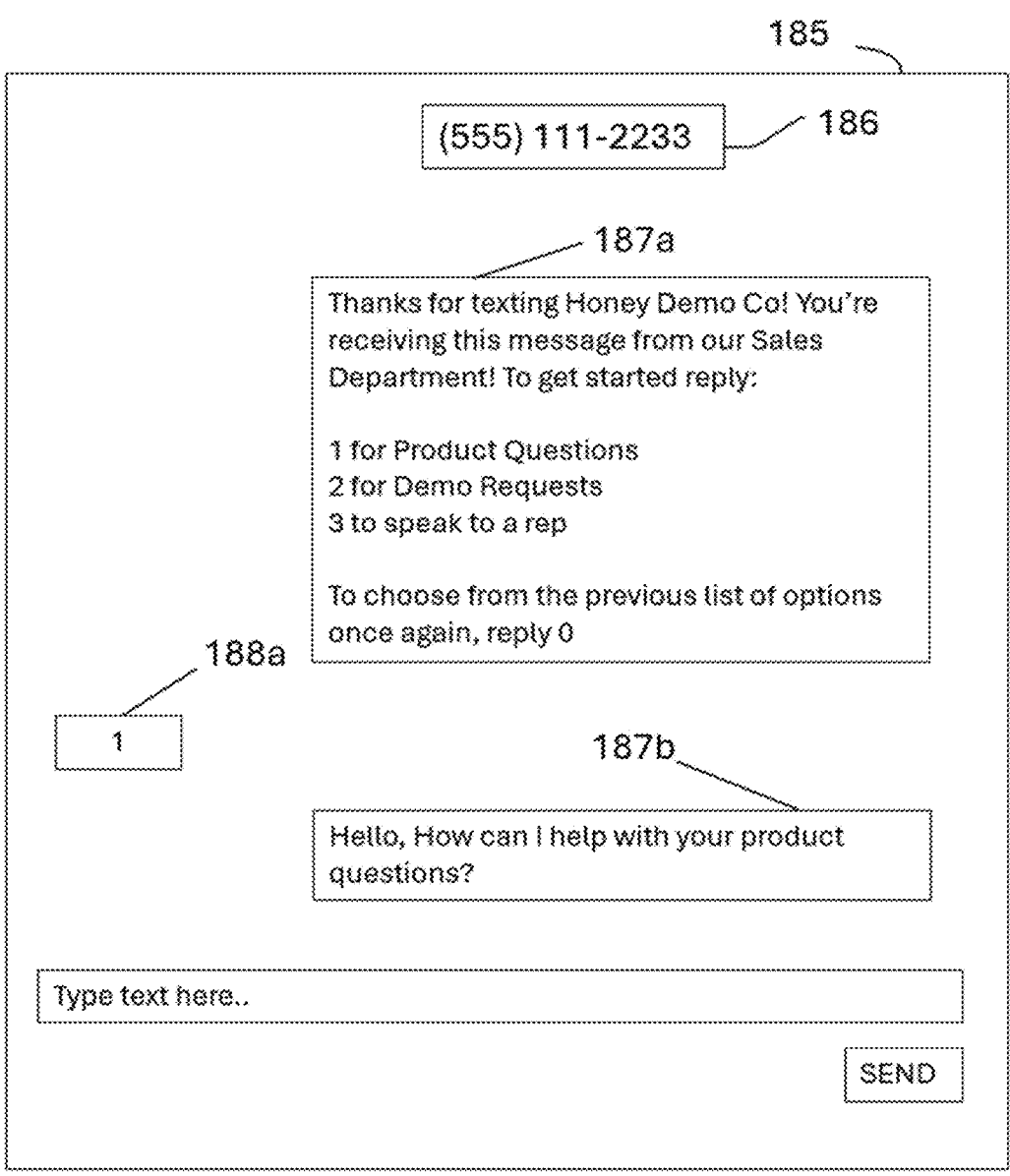
FIG. 4 depicts a screen shot of a second text message thread (separate from the first text message thread shown in FIG. 3) generated after the first communication device is transferred from the first text message thread with the first ITR-linked phone line to the second text message thread, which is now between the first communication device and a second phone line linked to the ITR application and having a unique 10-digit phone number different from the phone number of the first communication device of FIG. 3.

FIG. 4 depicts a screen shot of an exemplary text message thread 185 (separate from the text message thread 180 shown in FIG. 3) generated between the communication device 120 and a second phone line 170*b* linked to the ITR application and having a unique 10-digit phone number 186 (in this case, "(555) 111-2233") that is different from the phone number 183 (i.e., "(555) 111-2222") of the first phone line 170*a*. As mentioned above, this second text message thread 185 is generated as a result of a transfer of the communication device 120 from the first text message thread 180 (where the communication device 120 was able to exchange text messages with the first phone line 170*a*) to the second text message thread 185.

The exemplary second/separate text message thread 185 illustrated in FIG. 4 is also taken from the point of view of the communication device 120 (i.e., the text message thread that would be seen by the operator of the communication device 120), and displays the unique (in this case, 10-digit) phone number 186 of the second phone line 170*b*, namely, "(555) 111-2233," which is communicating (i.e., texting) with the communication device 120 (e.g., via the A2P/P2P texting network 130 discussed above with reference to FIG. 1).

In the example shown in FIG. 4, the first text message 187*a* sent from the ITR application-linked (e.g., DID) second phone line 170*b* to the communication device 120 provides a welcome greeting from the sales department to the customer (e.g., from the user of the second phone line 170*b*), and invites the customer to enter a response (in this exemplary case, a numerical response) that corresponds to a further option that is of interest to the customer. In this example, the welcome greeting within the text message 187*a* invites the customer to select either "1," "2," or "3," to either ask "Product Questions," make "Demo Requests," or "Speak to a Rep," respectively. The exemplary responsive first text message 188*a* sent from the communication device 120 to the ITR application-linked second phone line 170*b* (in response to the text message 187*a*) indicates that the contact or customer operating the communication device 120 is interesting in asking questions regarding the products offered by the sales team. In one aspect, in response to receipt of the text (i.e., "1") of the first text message 188*a*, the computing device 150 assigns a tag or designation to create a record of the text message 188*a* sent by the customer in the second text message thread 180, which, as mentioned above, enables the computing device 150 to track the progress of the customer within any given text message thread of the interactive text response system 100. As mentioned above, this tag/designation may be stored in the database 140.

In the example shown in FIG. 4, the first exemplary text message 187*a* sent from the ITR application-linked phone line 170*b* to the communication device 120 is sent by a virtual assistant or bot (but may be sent by a live agent), while the second exemplary the second text message 187*b* sent within the second text message thread 185 from the ITR application-linked phone line 170*b* to the communication device 120 in response to the first text message 188*a* sent by the communication device 120 to the ITR application-linked phone line 170*b* is a text message that is sent from an actual human member of the sales team, who has been given by the computing device 150 control of the second text message thread 185, and who will be now permitted to directly communicate by text messages with the operator of the communication device 120 (and, of course, who has an option to transfer the customer's communication device 120 to a third text message thread with a third (separate) (DID) phone line 170, which has a different ten-digit phone number relative to the phone lines 170*a* and 170*b*).

FIG. 5 shows an exemplary embodiment of an exemplary method 200 of managing application-to-person text messages. The method 200 includes receiving, by an application running on a computing device 150 and providing access to application-linked phone lines 170*a* and 170*b* each having an individual assigned phone number, a first text message from a first communication device 120 having a unique phone number (step 210). As pointed above, the method 200 is not limited to managing application-to-person text messages and may be employed in the context of person-to-person text messages.

The exemplary method 200 further includes generating, in response to the receiving of the first text message, a first text message thread 180 that includes the first communication device 120 and a first application-linked phone line 170*a*

(see FIG. 1) having a first phone number 183 (see FIG. 3), where the first text message thread 180 is configured to display a text message transfer option 184 selectable/interactable with by a user of the first communication device 120 as shown in FIG. 3 (step 220). As mentioned above, to facilitate the transfer of the first communication device 120 from the first text message thread 180 to a second text message thread 185 to communicate with a second application-linked phone line 170*b*, the text message transfer option 184 may, for example, require the user of the communication device 120 to response to a text-based prompt by entering a phrase, number, etc. click on a link, etc. . . .

The exemplary method 200 illustrated in FIG. 5 further includes, in response to the user of the first communication device 120 interacting with the text message transfer option ccc within the first text message thread 180, transferring the first communication device 120 to communicate, via at least one text message, with a second application-linked phone line 170*b* having a second phone number 186 that is different from the phone number 183 of the first application-linked phone line 170*a* (step 230).

As such, as pointed out above, the method 200 may be used to allow direct inward dialing (DID) users of business communication software-linked phone lines 170 to transfer select certain application-to-person ten-digit long code (A2P 10DLC) messages, short message system (SMS) messages, multimedia message system (MMS) messages, rich communication service (RCS) messages, or over-the-top (OTT) messages, and transfer message threads including such messages to one or more other user DIDs (having distinct phone numbers) within the same business communication software.

Manual and Dynamic Message Delivery Delay and Reflections

In some embodiments, the system 100 is configured to provide a user interface to create and specify pre-determined delays and reflections in association with outbound text message delivery. In such embodiments, a person using the first communication device 120 (e.g., a cell phone or the like) is permitted to choose to delay certain text messages (which may be sent via an application-to-person ten-digit long code (A2P 10DLC) system, a simple messaging system (SMS), a multimedia messaging system (MMS), a rich communication service (RCS), an over-the-top (OTT) messaging systems, or the like) for any amount of time the user chooses. In some aspects, the user may choose an option to be prompted with custom reflections the user creates, and the user is permitted to create multiple preset delays and reflections and assign contacts to them. In some aspects, an artificial intelligence (AI) engine may be used to suggest message consults or other actions.

Message Consults

In some embodiments, the system 100 is configured such that users of the business communication software can select certain thread history with a contact, a draft message, and or a debrief message to send to another user of the business communication software as a request for a consult, where the recipient of the request for consult can propose an alternative draft message and or prepare a consult message for return to the sender of the request for a consult, where the request for consult can be sent to an individual or an AI model, where such a return can be presented to the user who requested the request for a consult in the relevant thread, and where the user who received the return can disregard, use, or edit the alternative draft message and react to the consult message.

Predictive Machine Learning for Dynamic Message Delivery Delay, Message Consults, and Directives for Users of Instant Messaging within Business Communication Software In some embodiments, the system 100 is configured such that artificial intelligence is used to determine current and predictive contact sentiment, agent sentiment, and commercial relational status, based on intercepted messages, thread history, contact journey data, or other customer data across the organization, and where the system can dynamically increase or decrease message delivery delay, give directives to the agent, suggest custom reflections, predict how the contact might respond to various messages, or suggest or require message consults, to improve contact sentiment, agent sentiment, and commercial relationships as determined by predictive machine learning or various system presets and rules surrounding target attributes for contact sentiment, agent sentiment, and commercial relationships.

Exemplary directives include but are not limited to: (1) improved messages based on an outbound message that was intercepted; (2) improved inbound messages based on masked inbound messages; (3) suggested outbound messages based on customer journey data; and (4) predicting responses to various outbound messages based on thread history.

Machine Learning for Corporate Intelligence and Integrity in Communication

In some embodiments, the system 100 is configured such that the text messages sent by users of the application-linked phone lines 170 are checked/proofed for clarity and corporate integrity. For example, when a user of an application-linked phone lines 170 sends a text message (e.g., to a communication device 120 of a contact), the message, together with relevant thread history may be transmitted to an AI endpoint (e.g., a machine learning model) that is capable of detecting, for example, the clarity/vagueness of the message by determining, for example, specificity, conciseness and clarity of the language, and, if appropriate, responding with alternative language that can improve specificity, conciseness and clarity.

In some aspects, the machine learning model can be trained on certain biases of specificity, conciseness and clarity of the language trained into a base model. In certain aspects, the machine learning model may be trained/configured to log outcomes of such prompts and returns and their sources for corporate business intelligence purposes, compare any claims the text message being analyzed is making to prior claims other terminated messages have made through the corporation (whether terminated internally or externally corporate data such as but not limited to financial data, customer data, product specification data, technical data, standard operating procedures, standards, knowledge bases, or any other data the corporation wishes to train the AI model on), and to return alternative language to the user that more closely aligns with established corporate claims and/or data.

In certain implementations, when the user receives alternative language that more closely aligns with established corporate truth claims, the user can be presented with an explanation as to the alterations of the message with citations the user can click to view the truth claim amongst its associated claims, send the alternate message, edit the message prior to sending or ignore the message. In one aspects, the user is permitted to either sends or terminate a text message that was determined by the AI model to conflict with prior corporate claims.

In some aspects, the AI model can track and notify various users as predetermined by the system administrator, and the system administrator can choose when and where these notifications are sent based on the frequency of occurrence, the claims level of adherence to established claims, the claims' strength of association to the established claims, the strength of the established claim the claim is being associated with, the frequency in which the user adheres to established claims or other measures that can be used to determine the relevance of the suggested alternative language that was ignored.

In certain implementations, the AI model is trained on historical data and differentiates/identifies groups of claims that align with each other, but differ from other groups of claims that align with each other. In some aspects, such divergent claim clusters can be distilled and presented to designated subject matter experts or other users for determination of adherence to established corporate truth/established policies, with the AI model being trained in conjunction with such determinations being made. In one aspect, when a user wishes to understand corporate truths/established policies, the user can query the AI model using natural language and receive responses.

As such, the users can continue to query corporate truth claims in various scenarios and when corporate truth claims do not exist in certain scenarios, the AI model will return that no claim has been established for that scenario. In one implementation, when no claim exists for a certain scenario, and a user wishes to establish a corporate truth claim to fill the void, or a user wishes to update or delete a certain truth claim, the user can do so using plain language by entering the AIs training mode.

In some aspects, when a user is proposing a corporate truth claim, the AI model can prove the proposed truth claim prior to it being submitted to designated subject matter expert users. The subject matter experts may be determined by the AI model based on what users have established truth claims of related subject matter for the corporation. In certain aspects, when the AI is proving a proposed corporate truth, the subject matter of the proposed corporate truth can be identified.

In one aspect, the proving process is performed thru a method of question and answer using natural language, and the AI model will question the proposed corporate truths' ability to co-exist among other established corporate truths, and its ability to exist amongst scenarios that corporate truths of related subject matter exist within. In some aspects, the user proposing the corporate truth claim can answer the AI's proving questions to establish a new corporate truth proposal to be submitted to designated subject matter expert users. In an embodiment, a new corporate truth claim proposal is submitted to the designated subject matter expert users when the user chooses to submit and when no minimum proving cycles have been preset by the system administrator, or when the AI is satisfied that the new claim can coexist with established claims and has been proven of its own existence within common scenarios amongst claims of similar subject matter.

In certain aspects, when the proposed corporate truth claim is submitted to designated subject matter expert users, it can be presented as a truth claim with all associated truth scenarios that were established during the AI proving process. The subject matter experts may have the same ability to prove the proposed truth claim through the same natural language question and answer process, such that the claim's ability to co-exist with other corporate truth claims is proven, and the claim's ability to self-exist amongst scenarios common to claims with the related subject matter is proven. In some aspects, either a subject matter expert or the submitter can answer the subject matter experts' proving questions to further prove the claim. In certain embodiments, the subject matter expert or experts can reject or approve the new corporate truth claim and designate it as a novel truth claim or designate it as a replacement for an existing truth claim. In one example, when the subject matter expert or experts approve a new claim, they can designate the location of the claim in the corporate systems through classification. On the other hand, when a user acts to delete a truth claim, the user can do so using plain language, and the AI can assist the user in understanding all associated truth claims prior to submitting the deletion to designated subject matter experts for approval of deletion. Emotional Artificial Intelligence in Machine Learning Models for Matching and Improving Commercial Relationships Non-Commercial Personal Named Entity and Subjective Recognition as Selected Characteristics in Machine Learning-Based Commercial Relationship Analysis and Deep Learning-Based Directives for Matching and Improving Commercial Relationships In certain embodiments, a method of training machine learning models for employee customer commercial relationship analysis, where non-commercial personal named entity recognition and non-commercial subjective recognition can be used in combination with the same term frequency-inverse document frequency (TF-IDF) feature engineering. The term "frequency" can be represented by topical thread data in business communication software and where document frequency can be represented by thread data or wholistic customer journey communication data. In some aspects, the model can perform commercial relationship analysis based on presence and frequency of non-commercial parts of speech and their patterns with commercial parts of speech, and where deep learning artificial neural networks (ANNs) on the same patterns can be applied to recommend language to improve commercial relationships.

Verb Tense Indication as Selected Characteristics in Machine Learning-Based Commercial Relationship Analysis and Deep Learning-Based Directives for Matching and Improving Commercial Relationships In some embodiments, in a method of training machine learning models for employee customer commercial relationship analysis, a verb tense part-of-speech (POS) feature tagging can be used in combination with verb tense term frequency-inverse document frequency (TF-IDF) feature engineering. Here, the term "frequency" can be represented by topical thread data in business communication software, and the term "document frequency" can be represented by thread data, or wholistic customer journey communication data. In some aspects, the model performs commercial relational analysis based on verb tense patterns, where proliferative use of future, present or past verb tense patterns in term frequency compared to document frequency is indicative of commercial relational potential, depth, or health, and where deep learning artificial neural networks (ANNs) on verb tense uses and patterns can be applied to recommend language to improve commercial relational potential, depth or health.

Relational Utility for A2P Messaging Environments Post 10 DLC.

A2P 10DLC and OTT Inbound Message Termination Routing

In some embodiments, the system 100 applies specifically to message traffic directed to A2P ten-digit long code (10DLC) (direct internal dialing) DIDs, toll-free DIDs, over-the-top (OTT) endpoints, and or other omni channel messaging inboxes, such that the text message thread data, other user or contact generated data, system data, or metadata from inbound messages, can be used in combination with machine learning models to terminate the message to specific DIDs, OTT endpoints or other omni channel inboxes for P2P and A2P traffic.

In some exemplary embodiments, an inbound text message directed to any recipient in the system could be routed to an agent selected by the system based on factors such as commercial relationship potential and history. This feature may enable companies to scale without giving up the power of personal relationships, as well as to measure and influence the likelihood that customer support instances will be handled by an appropriate individual, e.g., someone the customer knows, taking into account factors such as the depth of personal relationships developed between multiple agents and the customer, surface contact a customer has with multiple agents, and potential benefits of protecting against a customer being too invested in a single agent or representative, and thus against the company being overly dependent on certain individual agents or reps.

A2P 10DLC and OTT Outbound Message Origination Routing

In some embodiments, the system 100 is configured to permit a user of business communications software (e.g., a user of an application-linked phone line) can terminate A2P 10DLC messages on behalf of many direct inward dialing (DID) users. Such messages can be originated from various DIDs based on various methods of assignment, and the methods of assignment can be drawn from multiple databases which can include assignment databases based on machine learning models, such as thread-based sentiment analysis machine learning models.

As an example, the system 100 may be configured so that a marketing entity may send a promotion to multiple customers or potential customers, with each recipient receiving the message from a respective agent or another individual with whom the recipient has had a positive interaction. The promotion could include personalized text such as, "Hi Bob, my company let me know that all of us reps are allowed to reach out to a customer we enjoyed working with to make a special offer, and I thought of you. I really appreciated it when you . . . and wanted to let you know I enjoyed working with you." As another example, an insurance company or another entity may use the system 100 to generate relational activity for its users automatically (e.g., "Happy birthday" messages, personal check-ins, tickets to games or other events, invitations to schedule an annual review of insurance policies, etc.)

Automatically Providing Directives to Parties to Instant Messaging Conversations in Real-Time In some embodiments, the system 100 may include the feature of intercepting text messages prior to receipt or delivery by and to a participant in the messaging conversation in order to supplant time as perceived by the end-user so that real-time directives can be achieved and delivered in the fundamentally linear communication stream of instant messaging.

For example, the system 100 may intercept an inbound message from an upset customer and present it in a more productive way to an agent. The agent could click to reveal the original data to check if anything is missing in the message edited by the system 100. In some aspects, the improved/revised message could also come with a confidence score to help the agent decide if revealing the message is worth the potential (e.g., emotional) cost. The system could also present the original message alongside the message that was improved for productivity. As such, the agent could give the customer the benefit of the doubt that what the customer really meant as reflected by the system-improved message. In some cases, a relationship between an agent and a customer may be improved if potentially negative/offensive messages by a customer were mitigated in this way, and the relationship between the agent and customer was focused on service and providing value, resulting in increased trust, value bandwidth and revenue.

In view of the foregoing, the systems, graphical user interfaces, applications, and methods described in this application advantageously enable the transfer of a communication device with a unique phone number from a first text message thread that includes this communication device and phone line having a first phone number to a second text message thread separate from the first text message thread, where this communication device is permitted to communicate by text messages with at least a second phone line having a second phone number different from the first phone number.

While this invention has been described above by means of specific embodiments and applications thereof, numerous modifications and variations could be made thereto by those skilled in the art without departing from the scope of the invention set forth in the claims.

What is claimed is:

1. A method of managing application-to-person text messages, the method comprising:

receiving, by an application running on a computing device and providing access to application-linked phone lines each having an individual assigned phone number, a first text message from a first communication device having a unique phone number;

generating, in response to the receiving of the first text message, a first text message thread that includes the first communication device and a first application-linked phone line having a first phone number, the first text message thread configured to display a text message transfer option selectable by a user of the first communication device; and in response to the user of the first communication device interacting with the text message transfer option within the first text message thread, transferring the first communication device to communicate, via at least one text message, with a second application-linked phone line having a second phone number that is different from the phone number of the first application-linked phone line.

2. The method of claim 1 further comprising assigning one or more designations to the user of the first communication device to create a record of options selected by the user of the first communication device in response to one or more prompts presented to the user of the first communication device within the first text message thread.

3. The method of claim 1 wherein the transferring step further comprises generating a second text message thread that is separate from the first text message thread and that includes the first communication device and the second application-linked phone line but does not include the first application-linked phone line.

4. The method of claim 3, wherein the transferring step further comprises permitting an administrator of the application to at least one of: assign consent gathering bots, assign data gathering bots, provide self-service prompt options, set one or more notifications, and set data sharing that would accompany the transferring of the first communication device to communicate with the second application-linked phone line.

5. The method of claim 3, further comprising including, in the second text message thread, at least one of:

a thread history that displays at least a portion of the application-to-person text messages exchanged between the first communication device and the first application-linked phone line;

an interactive hyperlink which, when interacted with, causes the second text message thread to display at least a portion of the application-to-person text messages exchanged between the first communication device and the first application-linked phone line; and an attached file which, when opened, causes the second text message thread to display at least a portion of the application-to-person text messages exchanged between the first communication device and the first application-linked phone line.

6. The method of claim 3 further comprising:

generating within the first text message thread a consents and permissions option which, when interacted with by the user of the first communication device, permits the user of the first communication device to select a level of consent of the user of the first communication device to receive at least one of conversational, informational and promotional text messages, or to indicate a level of consent to share personal information by the user of the first communication device; and restricting at least some portions of the first text message thread from view within the second text message thread based on at least one of: permissions granted to users of the application-linked phone lines, settings defined by an administrator of the application, and privacy designations reflected by the level of consent of the user of the first communication device to share the personal information.

7. The method of claim 6, wherein the restricting step further comprises providing within the second text message a hyperlink which, when interacted with by a user of the second application-linked phone line, opens a secure web page to display, to the user of the second application-linked phone line, the portions of the first text message thread that are not displayed within the second text message thread.

8. The method of claim 1, wherein the transferring step further comprises generating, within the first text message thread, an informational message acknowledging a selection made by the user of the first communication device via the text message transfer option, wherein the informational text message notifies the user of the first communication device to expect a text message from the second application-linked phone line to which the first communication device is being transferred.

9. The method of claim 1, wherein the transferring step further comprises:

presenting two or more application-linked phone lines each having an individual assigned phone number that is different from the first application-linked phone line with an option to claim a transfer of the first communication device from the first application-linked phone line; and transferring the first communication device to the second text message thread to communicate via at least one text message with the application-linked phone line that was first to claim the transfer of the first communication device.

10. The method of claim 1, wherein the transferring step further comprises adding the second application-linked phone line having the second phone number into the first text message thread or a new group text message thread to permit the second application-linked phone line to communicate with the first communication device and with the first application-linked phone line within the first text message thread or the new group text message thread.

11. A system for managing application-to-person text messages, the system comprising:

an application executable on a computing device and providing access to application-linked phone lines each being associated with an individual assigned phone number, wherein the computing device is configured, via the application, to:

receive a first text message from a first communication device having a unique phone number;

generate, in response to receipt of the first text message, a first text message thread that includes the first communication device and a first application-linked phone line having a first phone number, the first text message thread configured to display a text message transfer option selectable by a user of the first communication device; and in response to an interaction by the user of the first communication device with the text message transfer option within the first text message thread, transfer the first communication device to communicate, via at least one text message, with a second application-linked phone line having a second phone number that is different from the phone number of the first application-linked phone line.

12. The system of claim 11, wherein the computing device is further configured to assign one or more designations to the user of the first communication device to create a record of options selected by the user of the first communication device in response to one or more prompts presented to the user of the first communication device within the first text message thread.

13. The system of claim 11, wherein the computing device is further configured to cause the application to generate a second text message thread that is separate from the first text message thread and that includes the first communication device and the second application-linked phone line but does not include the first application-linked phone line.

14. The system of claim 13, wherein the computing device is further configured to permit an administrator of the application to at least one of: assign consent gathering bots, assign data gathering bots, provide self-service prompt options, set one or more notifications, and set data sharing that would accompany the transferring of the first communication device to communicate with the second application-linked phone line.

15. The system of claim 13 wherein the computing device is further configured to cause the application to include, in the second text message thread, at least one of:

a thread history that displays at least a portion of the application-to-person text messages exchanged between the first communication device and the first application-linked phone line;

an interactive hyperlink which, when interacted with, causes the second text message thread to display at least a portion of the application-to-person text messages exchanged between the first communication device and the first application-linked phone line; and an attached file which, when opened, causes the second text message thread to display at least a portion of the application-to-person text messages exchanged between the first communication device and the first application-linked phone line.

16. The system of claim 13 wherein the computing device is further configured to cause the application to:

generate within the first text message thread a consents and permissions option which, when interacted with by the user of the first communication device, permits the user of the first communication device to select a level of consent of the user of the first communication device to receive at least one of conversational, informational and promotional text messages, or to indicate a level of consent to share personal information by the user of the first communication device; and restrict at least some portions of the first text message thread from view within the second text message thread based on at least one of: permissions granted to users of the application-linked phone lines, settings defined by an administrator of the application, and privacy designations reflected by the level of consent of the user of the first communication device to share the personal information.

17. The system of claim 16, wherein the computing device is further configured to cause the application to within the second text message a hyperlink which, when interacted with by a user of the second application-linked phone line, opens a secure web page to display, to the user of the second application-linked phone line, the portions of the first text message thread that are not displayed within the second text message thread.

18. The system of claim 11, wherein the computing device is further configured to:

cause the application to generate, within the first text message thread, an informational message acknowledging a selection made by the user of the first communication device via the text message transfer option, wherein the informational text message notifies the user of the first communication device to expect a text message from the second application-linked phone line to which the first communication device is being transferred.

19. The system of claim 11, wherein the computing device is further configured to cause the application to:

provide two or more application-linked phone lines each having an individual assigned phone number that is different from the first application-linked phone line with an option to claim a transfer of the first communication device from the first application-linked phone line; and transfer the first communication device to the second text message thread to communicate via at least one text message with the application-linked phone line that was first to claim the transfer of the first communication device.

20. The system of claim 11, wherein the computing device is further configured to cause the application to add the second application-linked phone line having the second phone number into the first text message thread or into a new group text message thread to permit the second application-linked phone line to communicate with the first communication device and with the first application-linked phone line within the first text message thread or the new group text message thread.

* * * * *